US010534100B2

(12) United States Patent
Magill et al.

(10) Patent No.: US 10,534,100 B2
(45) Date of Patent: Jan. 14, 2020

(54) SYSTEM AND METHOD FOR ASSESSING THE PRESENCE OF HYDROCARBONS IN A SUBTERRANEAN RESERVOIR BASED ON TIME-LAPSE SEISMIC DATA

(71) Applicant: CHEVRON U.S.A. INC., San Ramon, CA (US)

(72) Inventors: James R. Magill, Houston, TX (US); David C. Bartel, Houston, TX (US)

(73) Assignee: Chevron U.S.A. Inc., San Ramon, CA (US)

( * ) Notice: Subject to any disclaimer, the term of this patent is extended or adjusted under 35 U.S.C. 154(b) by 147 days.

(21) Appl. No.: 15/794,058

(22) Filed: Oct. 26, 2017

(65) Prior Publication Data

US 2019/0129049 A1 May 2, 2019

(51) Int. Cl.
*G01V 1/28* (2006.01)
*G01V 1/30* (2006.01)

(52) U.S. Cl.
CPC .............. *G01V 1/288* (2013.01); *G01V 1/282* (2013.01); *G01V 1/30* (2013.01); *G01V 1/307* (2013.01); *G01V 1/308* (2013.01); *G01V 2210/1234* (2013.01); *G01V 2210/65* (2013.01); *G01V 2210/66* (2013.01)

(58) Field of Classification Search
CPC ........ G01V 1/282; G01V 1/307; G01V 1/308; G01V 1/288; G01V 1/30; G01V 1/306; G01V 2210/1234; G01V 2210/614; G01V 2210/632; G01V 2210/65; G01V 2210/66; G01V 2210/665

USPC ...................................................... 702/14, 16
See application file for complete search history.

(56) References Cited

U.S. PATENT DOCUMENTS

| | | | |
|---|---|---|---|
| 7,869,955 B2 | 1/2011 | Zhang et al. | |
| 2008/0189043 A1 | 8/2008 | Anno et al. | |
| 2009/0192718 A1 | 7/2009 | Zhang et al. | |
| 2010/0177595 A1 | 7/2010 | Khare et al. | |
| 2016/0209531 A1 | 7/2016 | Bornhurst et al. | |
| 2017/0235000 A1 | 8/2017 | Cocker et al. | |
| 2018/0329096 A1* | 11/2018 | Magill | G01V 1/307 |

FOREIGN PATENT DOCUMENTS

| | | |
|---|---|---|
| CN | 102508294 B | 11/2013 |
| WO | 0019240 A2 | 4/2000 |

OTHER PUBLICATIONS

Houck R. T., et al. "Quantifying the uncertainty in an AVO interpretation", Geophysics, Society of Exploration Geophysicists, Feb. 1, 2002, vol. 67, No. 1, pp. 117-125.

(Continued)

*Primary Examiner* — John H Le
(74) *Attorney, Agent, or Firm* — Marie L. Clapp (57) ABSTRACT

A method is described for a manner of geologic analysis using time-lapse seismic data. The method includes steps to produce improved amplitude versus angle (AVA) information that may be used for analysis of geologic features of interest including estimation of pore fluid content and changes in the pore fluid content. The method assesses the probability of hydrocarbons in a subterranean reservoir based on seismic amplitude variations along offsets or angles for portions of a seismic horizon. The method may be executed by a computer system.

16 Claims, 8 Drawing Sheets

(56) References Cited

OTHER PUBLICATIONS

Thompson, P., et al. "Distinguishing gas san from shale/brine sand using elastic impedance data and the determination of the lateral extent of channel reservoirs using amplitude data for a channelized deepwater gas field in Indonesia" The Leading Edge, Society of Exploration Geophysicists, Mar. 1, 2009, pp. 312-317.
PCT International Search Report and Written Opinion, dated Oct. 10, 2018, issued in International Application No. PCT/IB2018/054076, filed on Jun. 7, 2018, 12 pages.
David E. Lumley, "Time-Lapse Seismic Reservoir Monitoring", Geophysics, Jan.-Feb. 2001, pp. 50-53, vol. 66, No. 1, Society of Exploration Geophysicists, 4th Wave Imaging Corp., Laguna Beach, CA, US.
Helene Hafslund Veire et al., "Stochastic Inversion of Pressure and Saturation Changes from Time-Lapse Seismic Data", SEG Technical Program Expanded Abstracts:1378-1381; 2003; https://doi.org/10.1190/1.1817545.
PCT International Search Report and Written Opinion, dated Jul. 19, 2019, issued in International Application No. PCT/IB2019/052331, filed on Mar. 22, 2019, 13 pages.

\* cited by examiner

SYSTEM AND METHOD FOR ASSESSING THE PRESENCE OF HYDROCARBONS IN A SUBTERRANEAN RESERVOIR BASED ON TIME-LAPSE SEISMIC DATA

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD

The present disclosure relates generally to methods and systems for probabilistic analysis of geologic features using seismic data and, in particular, methods and systems for assessing the probability of hydrocarbons in a subterranean reservoir based on seismic amplitude variations along offsets or angles for portions of a seismic horizon identified on two or more seismic images generated from two or more seismic surveys performed at different times.

BACKGROUND

Seismic exploration involves surveying subterranean geological media for hydrocarbon deposits. A survey typically involves deploying seismic sources and seismic sensors at predetermined locations. The sources generate seismic waves, which propagate into the geological medium creating pressure changes and vibrations. Variations in physical properties of the geological medium give rise to changes in certain properties of the seismic waves, such as their direction of propagation and other properties.

Portions of the seismic waves reach the seismic sensors. Some seismic sensors are sensitive to pressure changes (e.g., hydrophones), others to particle motion (e.g., geophones), and industrial surveys may deploy one type of sensor or both. In response to the detected seismic waves, the sensors generate corresponding electrical signals, known as traces, and record them in storage media as seismic data. Seismic data will include a plurality of "shots" (individual instances of the seismic source being activated), each of which are associated with a plurality of traces recorded at the plurality of sensors.

In some cases, it is desirable to analyze the recorded seismic amplitudes. This may be done in many ways. One step in conventional processing of seismic reflection data involves adding multiple seismic traces that share a common mid-point, but have different source-receiver offsets. This is commonly called "stacking". Stacking generally improves the signal to noise ratio, but can result in ambiguity surrounding the cause of the seismic amplitudes. For example, a high seismic amplitude could indicate either the presence of fluids or the presence of a particular lithology.

One conventional technique that can provide an improved method of delineating between lithology and fluids is employment of amplitude versus offset (AVO) or angle (AVA) for a representative offset/angle gather. Those of skill in the art would be aware that amplitude versus angle (AVA) is often used interchangeably with amplitude versus offset (AVO).

During processing, this type of AVA data may not be stacked thereby to preserve information that can be used to distinguish indicators of fluids from indicators of lithology. For example, considering a seismic trace, in one scenario, a hydrocarbon-bearing sand may generally have an increasingly negative seismic amplitude at further source-receiver offsets compared to a water-bearing sand which may be indicated by a decrease in positive seismic amplitude at further source-receiver offsets.

The production of hydrocarbons causes changes in the elastic parameters of the earth. These changes may occur due to water displacing oil (or vice versa), water displacing gas (or vice versa), or gas displacing oil (or vice versa), within the reservoir interval. In other cases, the changes in the elastic parameters may occur due to enhanced hydrocarbon recovery operations, $CO_2$ injection, or clathrate dissociation from solid to gas. Time-lapse (4D) seismic data is acquired to compare seismic data at different times via two or more seismic surveys, a seismic survey at time one ($T_1$) and another seismic survey from time two ($T_2$), conducted months or years apart. The differences in the seismic responses for $T_1$ and $T_2$ are at least partially due to fluid movement and/or pressure changes due to production or injection of water or gas. Conventionally, these differences in seismic response are qualitatively interpreted relative to modeled response behaviors due to fluid and pressure changes. Typically, the seismic survey from $T_1$ is referred to as the baseline survey, and the seismic survey from $T_2$ is referred to as the monitor survey. However, in the case for more than one monitor survey we could be analyzing two monitor surveys, where the seismic survey from $T_1$ is an early monitor survey and the seismic survey from $T_2$ is another monitor survey recorded at some time $T_2$ where $T_2$ is months or years after $T_1$.

The above methods may however often be biased and may not truly represent the geologic features. In addition, conventional methods may fail where seismic data quality is low, such as where random and/or coherent noise is prevalent, or where seismic gathers are not flat. The ability to define the location of rock and fluid property changes in the subsurface is crucial to our ability to make the most appropriate choices for purchasing materials, operating safely, and successfully completing projects. Project cost is dependent upon accurate prediction of the position of physical boundaries and fluid content within the Earth. Decisions include, but are not limited to, budgetary planning, obtaining mineral and lease rights, signing well commitments, permitting rig locations, designing well paths and drilling strategy, preventing subsurface integrity issues by planning proper casing and cementation strategies, and selecting and purchasing appropriate completion and production equipment.

There exists a need for seismic processing methods capable of producing improved time-lapse AVA information that may be used for analysis of geologic features of interest.

SUMMARY

In accordance with some embodiments, a method of time-lapse fluid assessment in a subterranean volume of interest including receiving a digital seismic dataset recorded at a first time representative of a subsurface volume of interest, a digital seismic dataset recorded at a second time representative of the subsurface volume of interest, and a range of geological and geophysical parameters possible in the subsurface volume of interest; identifying at least one spatial area of interest; calculating measured baseline seismic amplitude versus angle (AVA) responses from the digital seismic dataset recorded at the first time and measured monitor seismic AVA responses from the seismic dataset recorded at the second time in the at least one spatial area; computing amplitude difference AVA responses from the measured baseline seismic AVA responses and measured monitor seismic AVA responses; performing probabilistic amplitude analysis of at least two of the measured baseline seismic AVA responses, the measured monitor seismic AVA responses, and the amplitude difference AVA responses using the range of geological and geophysical parameters; and estimating time-lapse reservoir properties within the at least one spatial area of interest based on the probabilistic amplitude analysis of the measured seismic AVA responses is disclosed.

In another aspect of the present invention, to address the aforementioned problems, some embodiments provide a non-transitory computer readable storage medium storing one or more programs. The one or more programs comprise instructions, which when executed by a computer system with one or more processors and memory, cause the computer system to perform any of the methods provided herein.

In yet another aspect of the present invention, to address the aforementioned problems, some embodiments provide a computer system. The computer system includes one or more processors, memory, and one or more programs. The one or more programs are stored in memory and configured to be executed by the one or more processors. The one or more programs include an operating system and instructions that when executed by the one or more processors cause the computer system to perform any of the methods provided herein.

BRIEF DESCRIPTION OF THE DRAWINGS

Like reference numerals refer to corresponding parts throughout the drawings.

DETAILED DESCRIPTION OF EMBODIMENTS

Described below are methods, systems, and computer readable storage media that provide a manner of geologic analysis using seismic data. These embodiments are designed to calculate probabilities of hydrocarbons (i.e. fluid property estimation) in subsurface geologic features and changes in those probabilities after production and/or injection. Industry standard techniques use deterministic estimation of the underlying geologic and geophysical parameters which contribute to the amplitude versus angle response utilizing forward modeling or inversion. The subsurface parameters of interest are the thickness, pore fluid (brine, oil, gas), hydrocarbon saturation, porosity, etc. The present method combines probabilistic AVA/AVO (amplitude versus angle/amplitude versus offset) and spatial summation of amplitude versus offset gathers with a Bayesian analysis to determine the range of geologic and geophysical parameters that will fit a user-selected range of measured field responses with selected areas. The probabilistic estimation builds a model space with a regular grid, then a singular bin is located for a given seismic trace and the property estimation is based on counting models in that singular bin. The present invention allows boxes based on the seismic data to be defined in the model space based on the probabilistic analysis from which the property estimation is done by counting models in the boxes.

Reference will now be made in detail to various embodiments, examples of which are illustrated in the accompanying drawings. In the following detailed description, numerous specific details are set forth in order to provide a thorough understanding of the present disclosure and the embodiments described herein. However, embodiments described herein may be practiced without these specific details. In other instances, well-known methods, procedures, components, and mechanical apparatus have not been described in detail so as not to unnecessarily obscure aspects of the embodiments.

Seismic imaging of the subsurface is used to identify potential hydrocarbon reservoirs. Seismic data is acquired at a surface (e.g. the earth's surface, ocean's surface, or at the ocean bottom) as seismic traces which collectively make up the seismic dataset. The seismic dataset may be processed and imaged via a pre-stack method in order to analyze the seismic amplitude versus angle (AVA) or offset (AVO). Seismic surveys, generally called a baseline survey and one or more monitor surveys, conducted at different times (months or years apart) are used to monitor changes in the subsurface and are processed and imaged to create images that will show differences in seismic amplitudes.

The present invention includes embodiments of a method and system for assessing changes in reservoir properties over a period of time in a subterranean reservoir to determine the probability of hydrocarbons remaining after production and/or injection, in some embodiments estimating the probability of various saturation changes and/or pressure changes. Saturation changes are used to describe fluid changes in reservoirs that contain more than one type of fluid or gas or reservoirs where one fluid is partially replacing another as a result of hydrocarbon production or injection. Reservoir properties may include at least one of pore fluid content, porosity, brine composition, hydrocarbon composition, pressure, temperature, or any combination thereof. Determining the most probable changes in reservoir properties in a geologic feature and a range of possible changes in reservoir properties allows strategic planning around budgetary planning, obtaining mineral and lease rights, signing well commitments, permitting rig locations, designing well paths and drilling strategy, preventing subsurface integrity issues by planning proper casing and cementation strategies, selecting and purchasing appropriate completion and production equipment, and enhanced production strategies such as water or steam injection, as well as ultimately drilling into an optimum location to produce the hydrocarbons.

Figure 1:
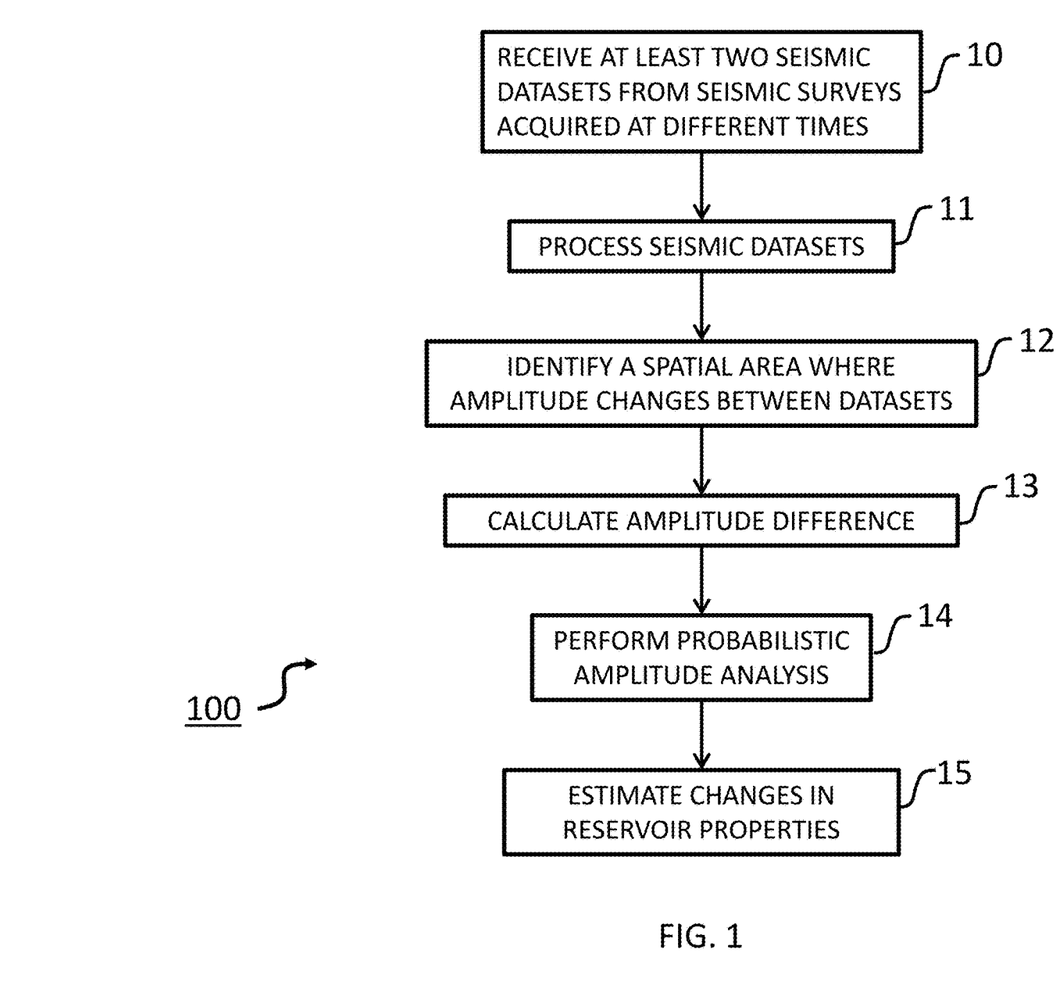
FIG. 1 illustrates a flowchart of a method of analyzing geologic features using seismic data, in accordance with some embodiments.

FIG. 1 illustrates a flowchart of a method 100 for time-lapse geologic analysis of a subsurface volume of interest. At operation 10, at least two seismic datasets that were recorded at different times (i.e., baseline and monitor datasets), generally months or years apart, are received. The earlier seismic dataset is generally referred to as the baseline dataset and the subsequent datasets are monitor datasets. As previously described, a seismic dataset includes a plurality of traces recorded at a plurality of seismic sensors. Due to changes in the reservoir properties caused by hydrocarbon production and/or injection, the seismic responses recorded at the two different times will be different in affected areas.

Method 100 moves on to process the seismic datasets 11 using substantially similar processing flows to create digital seismic images. These datasets may be subjected to a number of seismic processing steps, such as deghosting, multiple removal, spectral shaping, and the like, before undergoing a pre-stack seismic imaging process. These examples are not meant to be limiting. Those of skill in the art will appreciate that there are a number of useful seismic processing steps that may be applied to seismic data. The processing should preserve the seismic signal and reduce noise. The resultant digital seismic images may be, for example, a pre-stack seismic image, one or more seismic angle stacks, or one or more digital seismic horizon amplitude maps. The seismic horizon amplitude maps may have been computed at a series of angles (or summation of adjacent angles) in place of migrated seismic gathers. The seismic amplitude maps are computed by extracting the seismic amplitude from the migrated seismic gathers (either exact amplitude, or a computation of seismic amplitude at times around the horizon computed as average, absolute, rms, maximum, minimum, or other computational method) at the interpreted horizon time. The seismic horizons may be represented in time or depth, being optionally flattened. As is known, flattening of seismic data is used to remove the influence of geological processes such as folding and faulting in one or more the lithological interfaces from the data, enabling images produced from the seismic data to be processed into horizontal layers, e.g., for easier interpretation. The flattening of seismic data is an optional step. The seismic image and seismic horizons may be two-dimensional (2-D) (e.g., a horizontal dimension "x" and a time or depth dimension "z") or three-dimensional (3-D) data sets (e.g., two perpendicular horizontal dimensions "x" and "y" and a time or depth dimension "z"). In some embodiments, the seismic horizon may be representative of the top of a hydrocarbon reservoir (top sand) and/or the base of the hydrocarbon reservoir (base sand).

Figure 3:
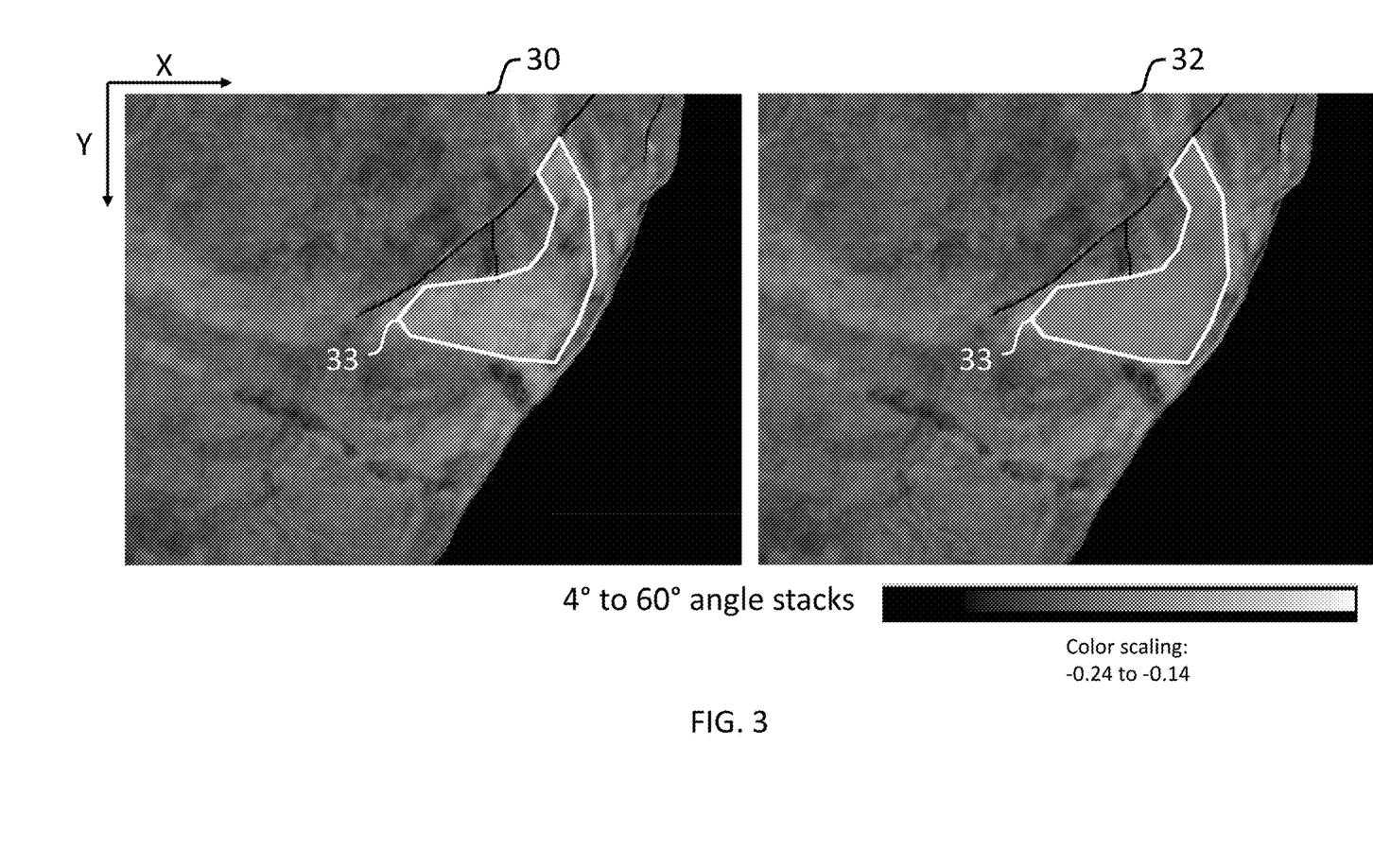
FIGS. 3-6 are examples of other steps from various embodiments.

At operation 12, the seismic images are interpreted to identify at least one spatial area on a seismic horizon that has differing amplitudes between the two seismic images. The seismic horizon should be representative of the reservoir that is being monitored. An example of this can be seen in FIG. 3. FIG. 3 shows map-view panels of a seismic horizon from a first time 30 and the same seismic horizon from a second time 32. In order to create these map views 30 and 32, a full range of seismic amplitude data has been stacked, which in this example embodiment is seismic amplitude data between angles 4° and 60°, as part of a data preprocessing step. The map indicates different regions of varying seismic amplitudes (indicated in differing shades) mostly correlating with the distribution of lithology, as well as liquids and gas, e.g., hydrocarbons. Interpretation of the seismic horizons shows that most of the amplitudes do not change between the two surveys. In one spatial area 33, the amplitudes do change, so this area is selected for analysis by the rest of method 100. The amplitude difference in this area is calculated at operation 13. In an embodiment, one or more areas of interest are identified on the seismic horizons. In an embodiment using 3-D data, the areas of interest may be identified on a map view of the one or more seismic horizons, e.g., as polygons, wherein the map view may be colored (or shaded or contoured) to indicate the seismic amplitudes along the particular horizon.

Figure 2:
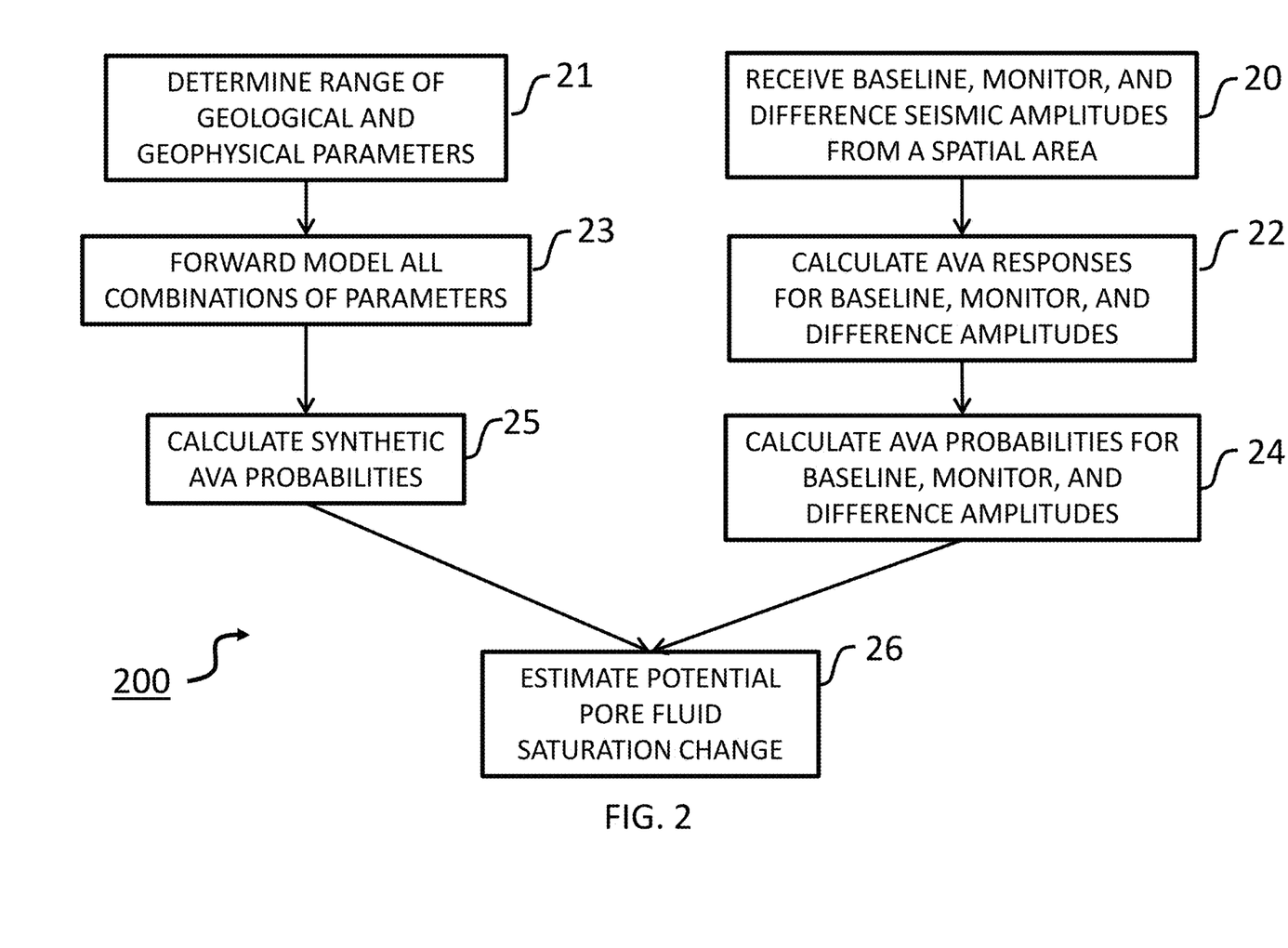
FIG. 2 is a flowchart of one step from an embodiment.

At operation 14, a probabilistic analysis is performed for the seismic amplitude versus angle (AVA) responses in at least one spatial area identified in the seismic image on at least one seismic horizon. An example of a method for doing this probabilistic analysis is shown in FIG. 2 as method 200. This method may include, for example, using the method of US 2016/0209531, System and Method for Analyzing Geologic Features Using Seismic Data, which is incorporated herein in its entirety. A pre-stack seismic image contains multiple seismic horizons that represent seismic events identified or selected, in an embodiment, by a user as being of interest. These seismic horizons may represent a single thin lithology, such as a sand layer or a shale layer, or an interface within one or between two or more lithologies.

In some embodiments, each area of interest may encase a large number of seismic trace locations. In terms of the present disclosure, it is important to include a sufficient number of seismic trace locations (resulting in a sufficient number of seismic traces or data sets to be processed) thereby to ensure statistical stability of the resulting AVA curves. By way of example and not limitation, a sufficient number of seismic trace locations may be on the order of thousands of trace locations.

The statistical data ranges are influenced and determined by a range of geology enclosed in the selected area of interest (i.e. polygon) and noise. The range of geology may include, for example, changes in thickness, porosity, grain size, cementation, mineralogical composition, or the like. Statistical stability of the data is ensured by making the area of interest (polygon) sufficiently large to ensure that the noise is averaged out, as well as large enough to contain a representative sampling of the geology.

Figure 4:
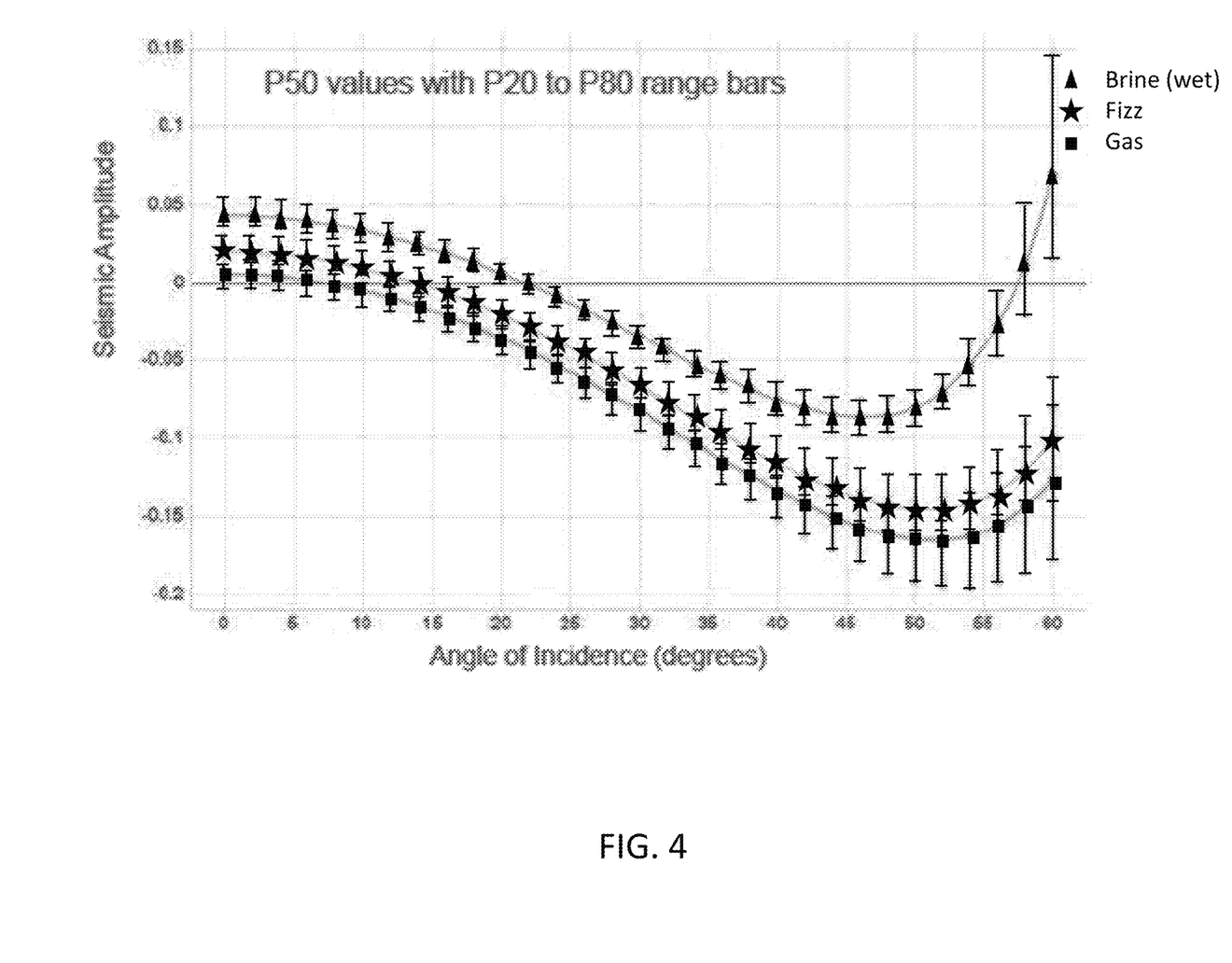

Referring again to FIG. 1, in operation 14 statistical data ranges are computed for the seismic amplitudes in each of the areas of interest, shown in the example of FIG. 4. These computations and calculations may be performed by reading seismic angle gathers, i.e. all of the seismic traces at a particular angle for an area of interest, identifying a time gate centered on the seismic horizon, and computing the aggregated amplitudes at each angle. The time gate has the effect of isolating a portion of each selected trace around a feature of interest in time. This process of computing the statistical data ranges for the seismic amplitudes in each of the areas of interest is computationally expensive.

A person skilled in the art would appreciate that the computation and calculations of statistical data ranges can be performed using pre-stack seismic data in depth coordinates, rather than time coordinates, and identifying a depth gate centered on the seismic horizon.

In terms of the present method it is advantageous to calculate the probability of various seismic amplitudes within the area of interest, thereby allowing the statistical data ranges of seismic amplitudes to be determined. In some embodiments, the statistical data ranges may be represented by P50 and an upper and a lower probabilistic value for seismic amplitudes, each of the upper and lower values being similarly offset from the P50 value. For example, the upper and lower probabilistic values may respectively be selected as a P10 and a P90 probabilistic value, a P20 and a P80 probabilistic value, a P30 and a P70 probabilistic value, or the like. These values are provided by way of example only and are not meant to be limiting.

Typically, the P50 probabilistic value represents the underlying signal, while the upper and lower probabilistic values are indicative of a probabilistic range which represents the variable geology and/or noise. A variety of statistics may be computed from the aggregated seismic amplitudes, i.e. in addition, or alternatively, to the probabilistic values mentioned above. For example, the statistical data ranges may include one or more of an average or mean (such as an average absolute amplitude), a mode, or a standard deviation such as RMS amplitude. It will be appreciated that other statistical measures may also be used. The use of many seismic trace locations from the areas of interest may assist in obtaining statistically significant data, in that the data may be more stable and distinct.

In addition, in another embodiment, angle stacks may be created by summing the seismic traces for each time or depth sample at two or more angles, e.g., adjacent angles. The angle stacks may be narrow, summing over a few adjacent angles, or broad, summing over many angles such as 10°-20°. Additionally, the ranges of angles summed over may overlap (e.g., 10°-20° and 15°-25°). A normalization based on the number of traces summed may be used in order to obtain an optimum presentation of the results. In other words, these narrow angle stacks may in some instances stabilize the trend of the AVA curves produced. It will however be appreciated that in many cases there may be no need for this type of stacking. As an alternative to using the AVA responses at particular angles or angle stacks, the statistical data ranges may be based on other criteria such as the gradient or rate of change of the seismic amplitude response with angle or other industry-recognized measurements in the field (e.g., fanfar, grenv).

FIG. 2 shows an embodiment of a method 200 for performing operation 14 of FIG. 1. Operation 20 receives the baseline, monitor, amplitude difference datasets from the previous operations of method 100. Operation 21 of method 200 determines possible ranges of geological and geophysical parameters expected in the reservoir zone being analyzed that affect the seismic amplitude versus angle response. The expected ranges of geological and geophysical parameters are determined by the user based on nearby known information (e.g., previously drilled wells), estimated from theoretical equations, or other such information sources to provide results which may best characterize the expected geological and geophysical parameters expected in the reservoir zone. Geophysical parameters may include elastic properties such as P-wave velocity (Vp), S-wave velocity (Vs), and density. Geological parameters may include brine composition, hydrocarbon composition, pressure, temperature, porosity, reservoir thickness, mineralogical composition, and other factors. These determinations may be done by regional analysis, geologic inference or analogs, petrophysical analysis from analog well logs, or other means. In one embodiment, those of skill in the art will be aware that there are a number of ways of determining reasonable ranges of geological and geophysical parameters for a particular subterranean volume.

Geological parameters may be determined, for example, for a situation in which there is advance knowledge of the deposition environment of the material. In this case, that knowledge may allow the user to determine information regarding what types of materials are likely to be present as well as what relationship various layers are likely to have. By way of example, an eolian deposition environment would tend to include sandstones that are relatively free of clay and relatively well-sorted. In contrast, deltaic sandstones would tend to be higher in clay content. In order to render the hypothetical physical properties more relevant to the analysis of the acquired seismic data, the types of sandstone generated would depend, at least in part, on whether the region under investigation includes wind-deposited or river delta deposited material and could be further differentiated based on specifics of the deposition environment. Geophysical parameters may be determined, for example, where there is local information available, such as from well cores or well logs from nearby wells.

At operation 22, the seismic amplitude versus angle (AVA) responses are calculated in at least one spatial area for each of the baseline, monitor, and amplitude difference datasets. This may be done, for example, using the method of US 2016/0209531, System and Method for Analyzing Geologic Features Using Seismic Data, which is incorporated herein in its entirety. A pre-stack seismic image contains multiple seismic horizons that represent seismic events identified or selected, in an embodiment, by a user as being of interest. These seismic horizons may represent a single thin lithology, such as a sand layer or a shale layer, or an interface within one or between two or more lithologies. At operation 24, AVA probabilities are calculated for the baseline, monitor, and amplitude difference AVA responses. These computations and calculations may be performed by reading seismic angle gathers, i.e. all of the seismic traces at a particular angle for an area of interest, identifying a time gate centered on the seismic horizon, and computing the aggregated amplitudes at each angle. The time gate has the effect of isolating a portion of each selected trace around a feature of interest in time. This process of computing the statistical data ranges for the seismic amplitudes in each of the areas of interest is computationally expensive. A person skilled in the art would appreciate that the computation and calculations of statistical data ranges can be performed using pre-stack seismic data in depth coordinates, rather than time coordinates, and identifying a depth gate centered on the seismic horizon.

In terms of the present method it is advantageous to calculate the probability of various seismic amplitudes within the area of interest, thereby allowing the statistical data ranges of seismic amplitudes for each of the datasets to be determined. In some embodiments, the statistical data ranges may be represented by P50 and an upper and a lower probabilistic value for seismic amplitudes, each of the upper and lower values being similarly offset from the P50 value. For example, the upper and lower probabilistic values may respectively be selected as a P10 and a P90 probabilistic value, a P20 and a P80 probabilistic value, a P30 and a P70 probabilistic value, or the like. These values are provided by way of example only and are not meant to be limiting.

Once the ranges of possible geological and geophysical parameters are determined, operation 23 proceeds to perform a full range of 2-layer or 3-layer forward modeling with all combinations of the geological and geophysical parameters. This may be done, for example, using a method such as that described in U.S. Pat. No. 7,869,955, Subsurface Prediction Method and System, which is incorporated herein in its entirety. By way of example and not limitation, pseudo-wells including multiple types of synthetic well logs may be generated. Pseudo-wells may include physical properties such as Vp, Vs, density, porosity, shale volume (Vshale), saturation, pore fluid type or other properties. In an embodiment, seismic models for the reservoir response first at conditions represented by the first seismic survey and then at a range of conditions representing expected changes in the reservoir properties that encompass the expected or measured properties represented by the time of the second seismic survey. These properties can be fluid saturation (brine, oil, gas), pressure, temperature, etc. These property changes should be represented by a number of discrete changes. In an embodiment, this may be a small number of discrete changes such as 2-5. The modeling of the reservoir at the initial state may include variations in reservoir thickness, porosity, and other properties. Using the forward modeling, this operation may also construct a series of results of the amplitude difference between the reservoir properties corresponding to the first (i.e., baseline) seismic data set and the suspected discrete parameter changes represented by the second (i.e., monitor) seismic data set. Once the synthetic AVA responses have been calculated at operation 23, the AVA probabilities are calculated at operation 25.

The pseudo-wells may be generated using a partially random approach. Rather than using a simple stochastic approach, in which any particular physical model is equally likely, the generation of the pseudo-wells may be constrained by physical constraints. The constraining may take place prior to the generating, or alternately, purely stochastic pseudo-wells may be later constrained (e.g., by eliminating wells having characteristics outside the constraints). As will be appreciated, it is likely to be more efficient to first constrain, then generate, the wells, but either approach should be considered to be within the scope of the present invention.

Figure 5:
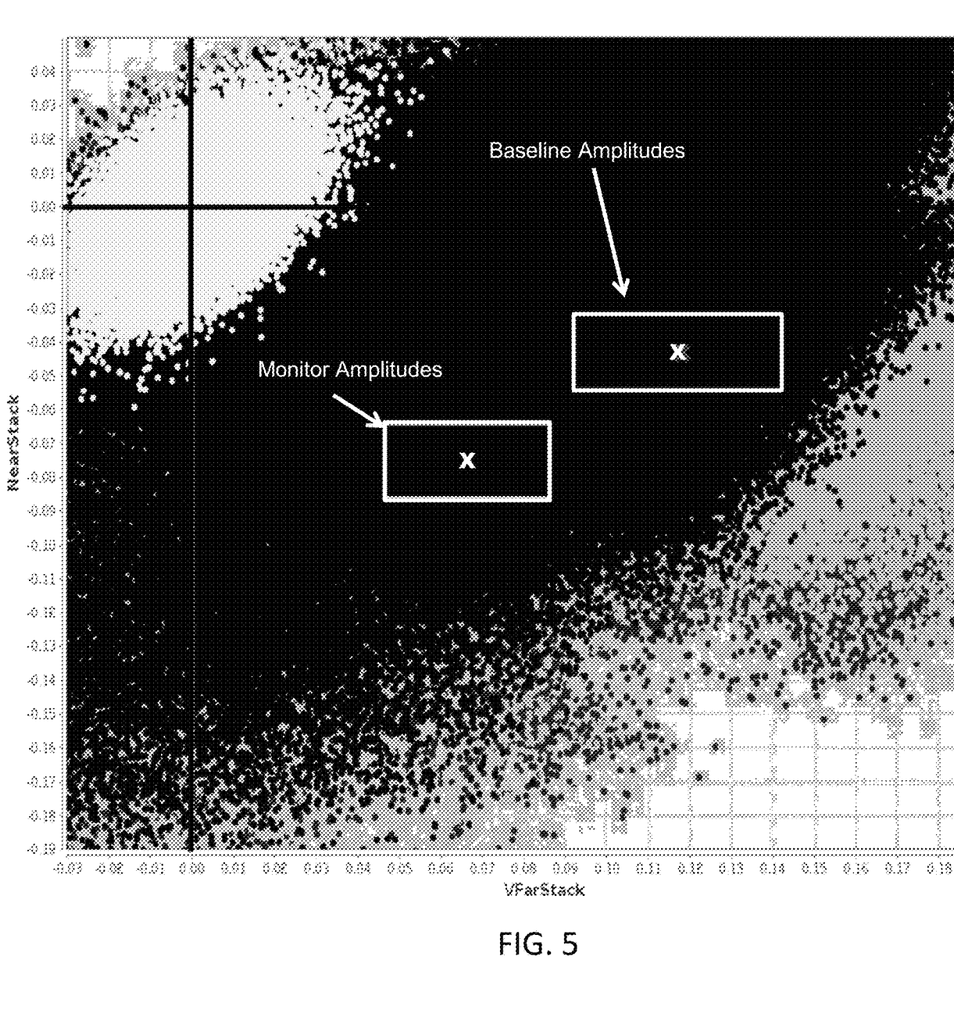
Figure 6:
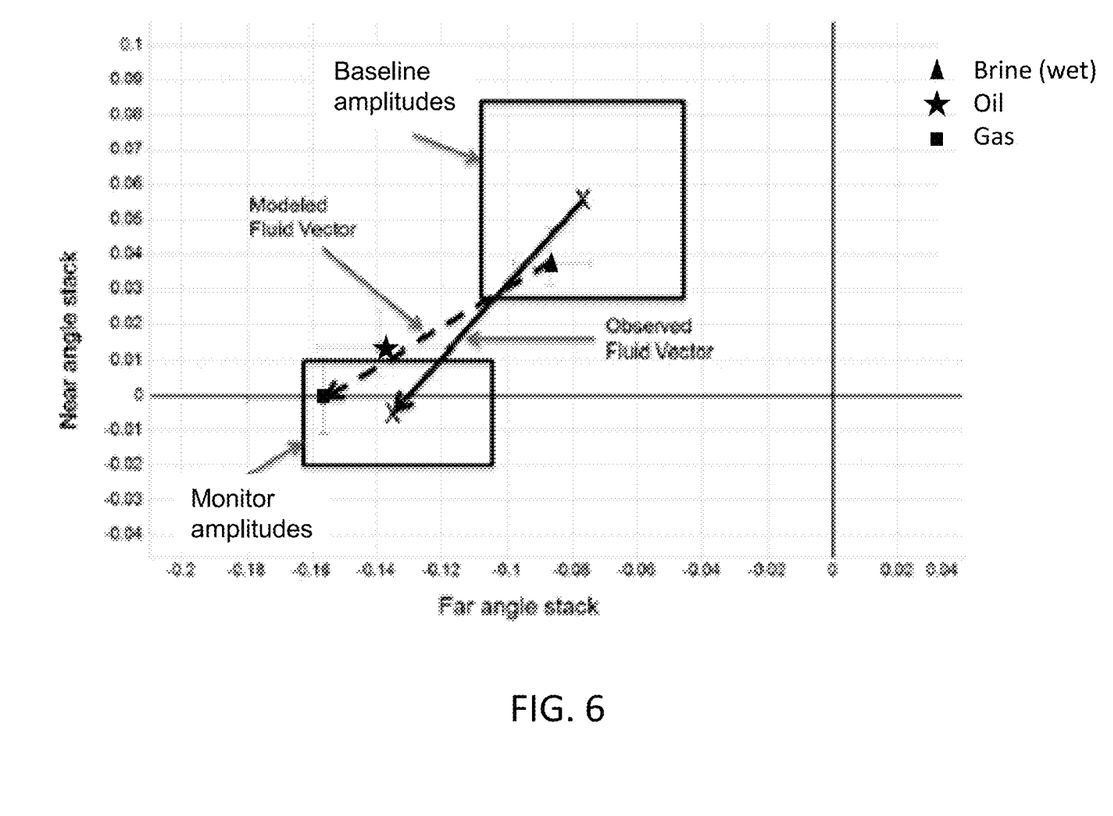

The forward modeling of operation 23 will produce modeled (i.e. synthetic) seismic gathers containing AVA effects for the various combinations of geological and geophysical parameters. Forward modeling may be done, for example, using some form of the Zoeppritz equation, full waveform modeling, or other such seismic modeling method that may be appropriate including that explained by U.S. Pat. No. 7,869,955. Then at operation 25, these synthetic seismic gathers are used to calculate the probability of various seismic amplitudes within the area of interest, thereby allowing the statistical data ranges of seismic amplitudes to be determined. For example, FIG. 4 shows AVA curves for three different fluid contents (brine/wet, fizz, and gas), including the P50 values (the triangle, star, and square symbols) with range bars indicating the P20-P80 ranges. Fizz is generally considered to be a low saturation, non-commercial amount of hydrocarbon gas (1% to 15% gas saturation) contained in the rock pores along with formation water. The seismic amplitude responses should be determined separately for brine, low and high hydrocarbon saturation, and different hydrocarbon fluids. The measured response ranges may also be segregated by different geological assessment of the mineralogical composition of the reservoir and non-reservoir rocks (i.e. facies) simulated in the forward modeling step. Other examples of the forward modeled responses can be seen in FIG. 5. In FIG. 5, the different grayscale dots indicate amplitudes as very-far-stack vs. near-stack for different fluid contents. Boxes defining the baseline amplitudes (amplitudes at the earlier time), monitor amplitudes (amplitudes at the later time), and difference amplitudes are based on the AVA probabilities calculated in operation 24, calculated from the input digital seismic images, are shown. FIG. 6 shows a similar plot of the baseline and monitor boxes but the forward modeled results have been simplified to the modeled fluid vector rather than the grayscale dots. To one skilled in the art, it would obvious that instead of defining a box around the P50 amplitudes at each measured angle to represent the range of possible models, one could also use an ellipse or other such shape to represent the spatial distribution of the data about the central value. Alternatively, a mathematical distribution characterizing the distribution of the data around the P50 amplitude could be estimated and used from operation 24 and forward in the analysis. Moreover, although FIG. 6 shows the box in two dimensions, the box (or ellipse or mathematical distribution) may be multi-dimensional. For example, if statistical data ranges are found for four different angles, the box would have four dimensions.

Method 200 can now proceed to operation 26, estimating the probability for changes in pore fluid saturation based on comparison of the calculated AVA probabilities from operation 24 and the calculated modeled AVA probabilities from operation 25. This estimation is done by comparing the amplitude difference AVA responses and the baseline and monitor AVA responses. By way of example, this may be done by using a two-box or three-box test, to estimate the change in reservoir properties in each polygon separately by considering the difference in the measured seismic amplitude versus angle responses between the first (baseline) and second (monitor) seismic survey within a single spatial polygon. This may be done by first determining the number of forward model responses which represent a reservoir in the initial state of the time of the first (i.e., baseline) seismic survey that have responses which fit into a box centered on the P50 response at each measured parameter and an extent determined by statistical measurements (e.g., P20-P80, standard deviation, etc.). The successful seismic models must have a calculated response which fits all of the measured response ranges. Next determine from this sub-class of forward model responses, those models which have a calculated response in the box centered on the P50 response from the monitor seismic survey at each measured parameter and an extent determined by statistical measurements (e.g., P20-P80, standard deviation, etc.). Next determine from this smaller sub-class of forward model responses, those models which have a calculated response in the box centered on the P50 response from the amplitude difference (baseline minus monitor or vice versa, as long as the order of subtraction is the same for the recorded seismic dataset sand the modeled/synthetic seismic datasets) at each measured parameter and an extent determined by statistical measurements (e.g., P20-P80, standard deviation, etc.). Any two or all 3 of the tests above can be used to determine the final subset of successful forward models. When doing only a two-box test, one of the tests should be using the amplitude difference data set. Analyze the total number of successful forward model responses which fit either the two or three tests used. The probability of each reservoir property change (e.g. saturation case) at the time of the second (i.e., monitor) seismic survey according to this hypothesis is the number of successful responses for that saturation case divided by the total number of successful responses.

Referring again to method 100 of FIG. 1, at operation 15 the result of method 200 can be used to estimate changes in reservoir properties. Seismic models can be used to estimate other reservoir properties. The estimated reservoir properties may include pore fluid content, porosity, brine composition, hydrocarbon composition, pressure, temperature, or any combination thereof. These estimated reservoir properties are estimates of the average geology in the spatial area of interest. Reservoir properties such as porosity, thickness, and Vshale can be estimated from these seismic models. Statistical measurements can be computed and summarized.

Although the embodiments above describe a method based on seismic horizons, a similar method may be used to allow interval analysis, which would include a probabilistic analysis of the reservoir thickness as well as other reservoir properties. This may be done by including a seismic attribute for an interval. For example, time thickness is a candidate for the seismic attribute, or average amplitude for an interval. Time thickness could be used as a seismic attribute to assure that the model and seismic thickness are broadly matched. Alternatively, time thickness for the seismic traces could be used to adjust the priors for the reservoir thickness of the models (greater than tuning thickness, less than tuning thickness, a mixture). Average amplitude for an interval could be useful for estimation of NTG (net to gross).

Figure 7:
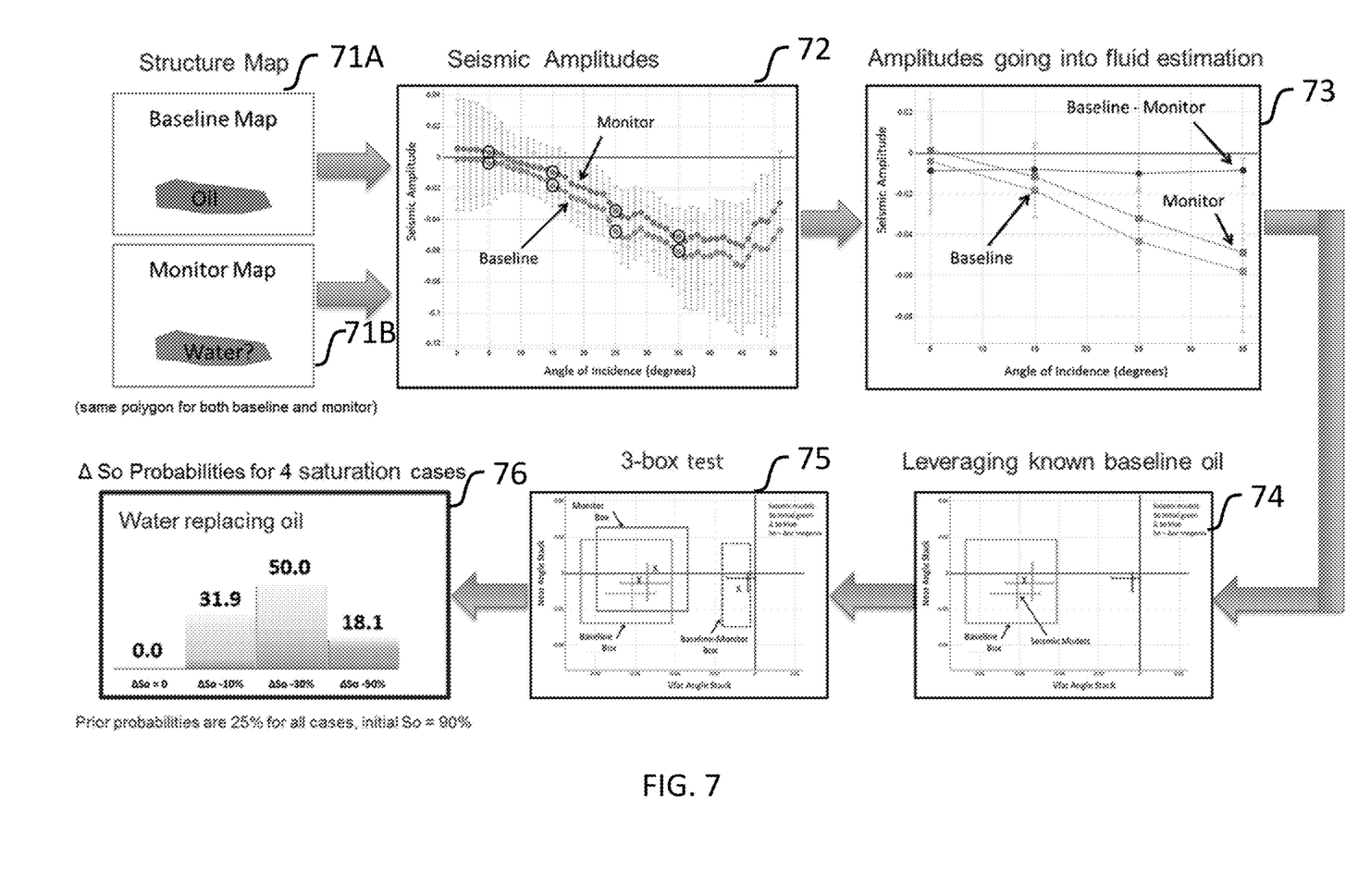
FIG. 7 illustrates steps and results from an embodiment.

FIG. 7 is an example of the steps of method 100 using method 200. The structure maps show the baseline map 71A and the monitor map 71B. Diagram 72 shows AVA probability curves created at operation 24 of method 200. Diagram 73 shows the AVA curves for the baseline seismic data, the monitor seismic data, and the amplitude difference between the baseline and monitor seismic data with angles selected for use in subsequent steps of method 200. Diagram 74 shows a box for known baseline oil, meaning that at the time of the baseline survey, the reservoir contained oil. Seismic models generated by method 200 at operations 23 and 25. Diagram 75 shows the three-box test described above. Diagram 76 shows the probabilities calculated as a result of method 100. Although these results are displayed graphically, this is not meant to be limiting. Other methods of presenting the results, such as in a spreadsheet format, are possible.

Figure 8:
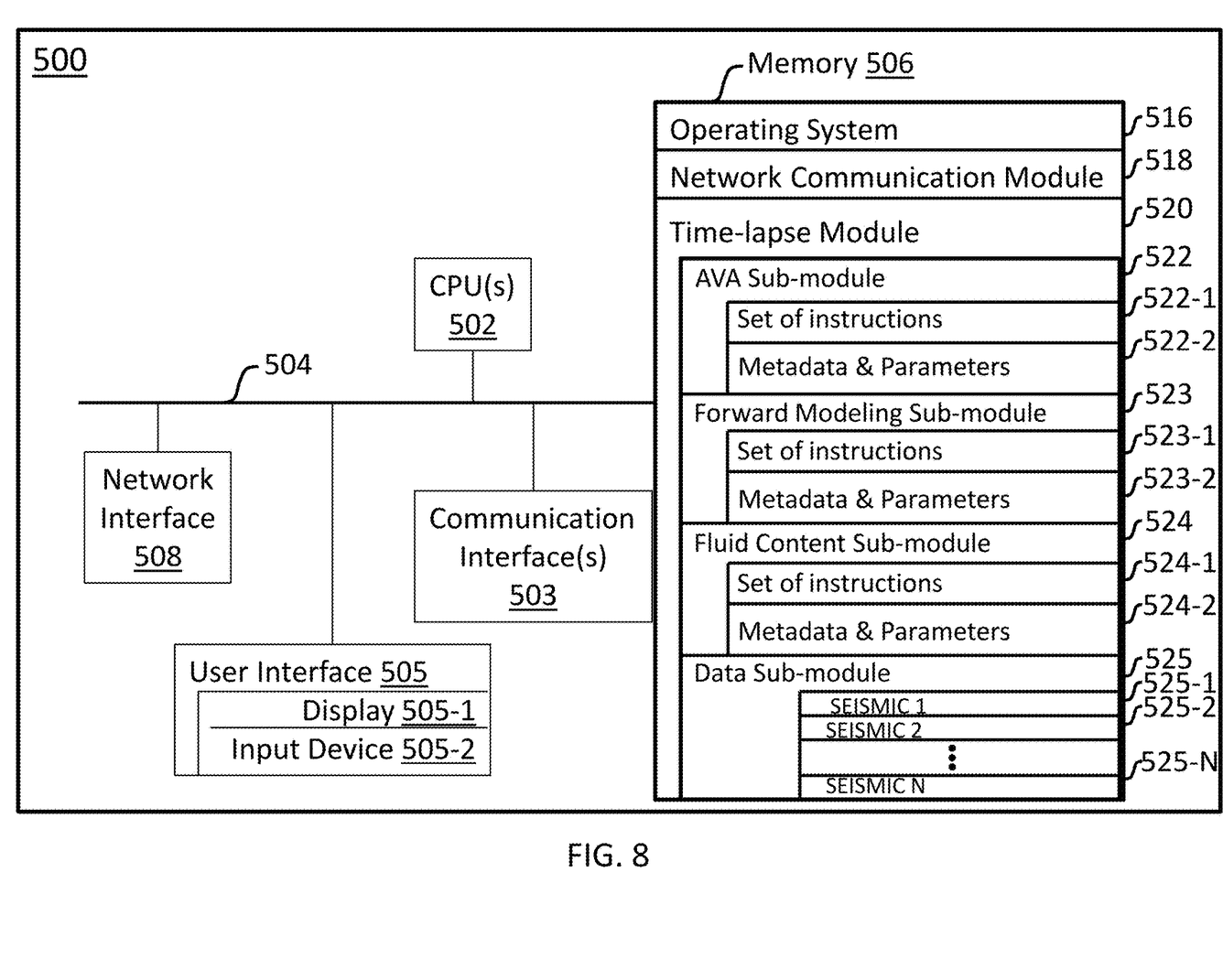
FIG. 8 is a block diagram illustrating a time-lapse fluid assessment system, in accordance with some embodiments.

FIG. 8 is a block diagram illustrating a time-lapse reservoir property assessment system 500, in accordance with some embodiments. While certain specific features are illustrated, those skilled in the art will appreciate from the present disclosure that various other features have not been illustrated for the sake of brevity and so as not to obscure more pertinent aspects of the embodiments disclosed herein.

To that end, the reservoir property assessment system 500 includes one or more processing units (CPUs) 502, one or more network interfaces 508 and/or other communications interfaces 503, memory 506, and one or more communication buses 504 for interconnecting these and various other components. The reservoir property assessment system 500 also includes a user interface 505 (e.g., a display 505-1 and an input device 505-2). The communication buses 504 may include circuitry (sometimes called a chipset) that interconnects and controls communications between system components. Memory 506 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 506 may optionally include one or more storage devices remotely located from the CPUs 502. Memory 506, including the non-volatile and volatile memory devices within memory 506, comprises a non-transitory computer readable storage medium and may store seismic data, velocity models, seismic images, and/or geologic structure information.

In some embodiments, memory 506 or the non-transitory computer readable storage medium of memory 506 stores the following programs, modules and data structures, or a subset thereof including an operating system 516, a network communication module 518, and a reservoir property module 520.

The operating system 516 includes procedures for handling various basic system services and for performing hardware dependent tasks.

The network communication module 518 facilitates communication with other devices via the communication network interfaces 508 (wired or wireless) and one or more communication networks, such as the Internet, other wide area networks, local area networks, metropolitan area networks, and so on.

In some embodiments, the time-lapse module 520 executes the operations of method 100. Time-lapse module 520 may include data sub-module 525, which handles the seismic image including seismic gathers 525-1 through 525-N. This seismic data is supplied by data sub-module 525 to other sub-modules.

AVA (amplitude versus angle) sub-module 522 contains a set of instructions 522-1 and accepts metadata and parameters 522-2 that will enable it to execute operation 11, 12, 13, and parts of 14 of method 100. The forward modeling function sub-module 523 contains a set of instructions 523-1 and accepts metadata and parameters 523-2 that will enable it to execute parts of operation 14 of method 100. The fluid content sub-module 524 contains a set of instructions 524-1 and accepts metadata and parameters 524-2 that will enable it to execute at least operation 15 of method 100. Although specific operations have been identified for the sub-modules discussed herein, this is not meant to be limiting. Each sub-module may be configured to execute operations identified as being a part of other sub-modules, and may contain other instructions, metadata, and parameters that allow it to execute other operations of use in processing seismic data and generate the seismic image. For example, any of the sub-modules may optionally be able to generate a display that would be sent to and shown on the user interface display 505-1. In addition, any of the seismic data or processed seismic data products may be transmitted via the communication interface(s) 503 or the network interface 508 and may be stored in memory 506.

Method 100 is, optionally, governed by instructions that are stored in computer memory or a non-transitory computer readable storage medium (e.g., memory 506 in FIG. 8) and are executed by one or more processors (e.g., processors 502) of one or more computer systems. The computer readable storage medium may include a magnetic or optical disk storage device, solid state storage devices such as flash memory, or other non-volatile memory device or devices. The computer readable instructions stored on the computer readable storage medium may include one or more of: source code, assembly language code, object code, or another instruction format that is interpreted by one or more processors. In various embodiments, some operations in each method may be combined and/or the order of some operations may be changed from the order shown in the figures. For ease of explanation, method 100 is described as being performed by a computer system, although in some embodiments, various operations of method 100 are distributed across separate computer systems.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method of reservoir property assessment in a subterranean volume of interest, comprising:
   a. receiving, at a computer processor, a digital seismic dataset recorded at a first time representative of a subsurface volume of interest, a digital seismic dataset recorded at a second time representative of the subsurface volume of interest, and a range of geological and geophysical parameters possible in the subsurface volume of interest;
   b. identifying at least one spatial area of interest;
   c. calculating, via the computer processor, measured baseline seismic amplitude versus angle (AVA) responses from the digital seismic dataset recorded at the first time and measured monitor seismic AVA responses from the seismic dataset recorded at the second time in the at least one spatial area;
   d. computing amplitude difference AVA responses from the measured baseline seismic AVA responses and measured monitor seismic AVA responses;
   e. performing, via the computer processor, probabilistic amplitude analysis of at least two of the measured baseline seismic AVA responses, the measured monitor seismic AVA responses, and the amplitude difference AVA responses using the range of geological and geophysical parameters; and
   f. estimating, via the computer processor, time-lapse reservoir properties within the at least one spatial area of interest based on the probabilistic amplitude analysis of the measured seismic AVA responses.

2. The method of claim 1 wherein the probabilistic amplitude analysis comprises:
   calculating, via the computer processor, statistical data ranges of the measured baseline seismic AVA responses based on the measured baseline seismic AVA responses;
   calculating statistical data ranges of the amplitude difference AVA responses based on the amplitude difference AVA responses;
   forward modeling, via the computer processor, all combinations of the geological and geophysical parameters to generate a set of synthetic seismic AVA responses;
   calculating, via the computer processor, statistical data ranges of the synthetic seismic AVA responses based on the set of synthetic seismic AVA responses; and
   comparing, via the computer processor, the statistical data ranges of the measured baseline seismic AVA responses and the amplitude difference AVA responses and the statistical data ranges of the synthetic seismic AVA responses.

3. The method of claim 2 further comprising:
   calculating, via the computer processor, statistical data ranges of the measured monitor seismic AVA responses based on the measured baseline seismic AVA responses; and
   comparing, via the computer processor, the statistical data ranges of the measured monitor seismic AVA responses and the statistical data ranges of the synthetic seismic AVA responses.

4. The method of claim 2 wherein the statistical data ranges are represented by a P50 probabilistic value, and upper and lower probabilistic values for seismic amplitudes, the upper and lower probabilistic values being similarly offset from the P50 value.

5. The method of claim 4 wherein the upper and lower probabilistic values are P80 and P20.

6. The method of claim 4 wherein the upper and lower probabilistic values are P90 and P10.

7. The method of claim 1 wherein the geophysical parameters include at least one of P-wave velocity (Vp), S-wave velocity (Vs), and density.

8. The method of claim 1 further comprising using the estimated reservoir properties to determine a well location and drill a well to produce hydrocarbons.

9. The method of claim 1 wherein the estimated time-lapse reservoir properties include at least one of saturation changes, pore fluid content, porosity, brine composition, hydrocarbon composition, pressure, temperature, porosity, reservoir thickness, mineralogical composition, or any combination thereof.

10. The method of claim 1 wherein the amplitude difference AVA responses are generated by taking the difference of amplitudes in the at least one spatial area at each spatial point for each angle.

11. The method of claim 1 wherein the digital baseline seismic dataset is a pre-stack baseline seismic dataset and the digital monitor seismic dataset is a pre-stack monitor seismic dataset.

12. The method of claim 1 wherein the digital baseline seismic dataset and the monitor seismic dataset include one or more angle stack seismic cubes, wherein each angle stack seismic cube represents a different angle or summed angle range.

13. The method of claim 1 wherein the digital seismic dataset at the first time and the digital seismic dataset at the second time include one or more seismic horizon amplitude maps, wherein each seismic horizon amplitude map represents a different angle or summed angle range.

14. The method of claim 1 wherein the estimating reservoir properties includes assuming that the amplitude difference AVA responses are due to changes in pore fluid while other reservoir properties are not different.

15. A computer system, comprising:
one or more processors;
memory; and
one or more programs, wherein the one or more programs are stored in the memory and configured to be executed by the one or more processors, the one or more programs including instructions that when executed by the one or more processors cause the system to:
receive, at the one or more processors, a digital seismic dataset recorded at a first time representative of a subsurface volume of interest, a digital seismic dataset recorded at a second time representative of the subsurface volume of interest, and a range of geological and geophysical parameters possible in the subsurface volume of interest;
identify at least one spatial area of interest;
calculate, via the one or more processors, measured baseline seismic amplitude versus angle (AVA) responses from the digital seismic dataset recorded at the first time and measured monitor seismic AVA responses from the seismic dataset recorded at the second time in the at least one spatial area;
compute, via the one or more processors, amplitude difference AVA responses from the measured baseline seismic AVA responses and measured monitor seismic AVA responses;
perform, via the one or more processors, probabilistic amplitude analysis of at least two of the measured baseline seismic AVA responses, the measured monitor seismic AVA responses, and the amplitude difference AVA responses using the range of geological and geophysical parameters; and
estimate, via the one or more processors, time-lapse reservoir properties within the at least one spatial area of interest based on the probabilistic amplitude analysis of the measured seismic AVA responses.

16. A non-transitory computer readable storage medium storing one or more programs, the one or more programs comprising instructions, which when executed by an electronic device with one or more processors and memory, cause the device to:
receive, at the one or more processors, a digital seismic dataset recorded at a first time representative of a subsurface volume of interest, a digital seismic dataset recorded at a second time representative of the subsurface volume of interest, and a range of geological and geophysical parameters possible in the subsurface volume of interest;
identify at least one spatial area of interest;
calculate, via the one or more processors, measured baseline seismic amplitude versus angle (AVA) responses from the digital seismic dataset recorded at the first time and measured monitor seismic AVA responses from the seismic dataset recorded at the second time in the at least one spatial area;
compute, via the one or more processors, amplitude difference AVA responses from the measured baseline seismic AVA responses and measured monitor seismic AVA responses;
perform, via the one or more processors, probabilistic amplitude analysis of at least two of the measured baseline seismic AVA responses, the measured monitor seismic AVA responses, and the amplitude difference AVA responses using the range of geological and geophysical parameters; and
estimate, via the one or more processors, time-lapse reservoir properties within the at least one spatial area of interest based on the probabilistic amplitude analysis of the measured seismic AVA responses.

* * * * *